Patented June 10, 1952

2,600,154

UNITED STATES PATENT OFFICE 2,600,154

ANTIOXIDANT

William H. Brugmann, Jr., Elizabeth, N. J., assignor to Standard Oil Development Company, a corporation of Delaware No Drawing. Application May 1, 1950, Serial No. 159,385

18 Claims. (Cl. 252—46.7)

The present invention relates to mineral lubricating oils and other petroleum hydrocarbon products containing as an additive an oxidation inhibiting or corrosion resisting agent.

Oxidation inhibiting addition agents for mineral oils, and especially for mineral lubricating oils, have been previously made by sulfurizing fats, fatty oils, and hydrocarbon materials with free sulfur by heating at an elevated temperature, and while such products have been used for many years, they are not satisfactory because the sulfurization is accompanied by side reactions such as cracking, polymerization and the like, which give rise to inactive constituents and darkly colored bodies, some of which may be merely useless while others are decidedly objectionable.

In accordance with the present invention an addition agent containing both sulfur and phosphorus may be prepared which is free from the above objectionable features. This product is prepared in two steps. In the first step, a phenol is reacted with phosphorus sulfochloride under conditions which cause the introduction of at least 1% by weight of each of the elements sulfur and phosphorus and at least 0.75% by weight of chlorine. In the second step of the process, the product thus formed is further reacted with an alkali metal salt of an organo-substituted thiophosphorous or dithiophosphoric acid, whereby an alkali metal chloride separates as a by-product, and the final reaction product contains an additional amount of sulfur and phosphorus. Blends of this product in oxidation inhibiting amounts in lubricating oils are light colored, and the product does not tend to produce strong or corrosive acids on hydrolysis in the presence of moisture.

In accordance with the process of this invention, about two molecular proportions of the phenol are reacted with one molecular proportion of phosphorus sulfochloride, the latter being preferably employed in slight excess of the order of 0.1 to 0.5 mols. The reactants are heated together, generally without the use of a solvent, at a temperature of about 100 to 160° C., preferably 110 to 140° C., for a period of time sufficient to produce a reaction product which, after separation of unreacted phosphorus sulfochloride, contains at least the amounts of sulfur, phosphorus and chlorine referred to above. This time is from about 1 to about 10 hours, and usually a period of 2 to 4 hours is sufficient. The reaction may be conducted without a catalyst, but it is generally advantageous to employ a catalyst of the Friedel-Crafts type, such as aluminum chloride, boron trifluoride, or stannic chloride. When a catalyst is employed, the same may be removed from the reaction product by washing with acidified ice water. Analyses of the products of this reaction do not indicate a definite single compound for the reaction product but rather a mixture of several types of compounds.

In the second step of the process, the reaction product of the phenol and phosphorus sulfochloride is heated, in the presence of a suitable inert solvent, such as chloroform, carbon tetrachloride, or a hydrocarbon solvent such as hexane or heptane if desired, with a metal salt of an organo-substituted acid of phosphorus of the formula—

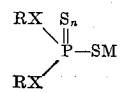

where R is a hydrocarbon radical containing 2 to 30, preferably 2 to 18, carbon atoms and may be an alkyl, cycloaliphatic, aryl, aralkyl, or alkaryl radical; X is oxygen or sulfur; M is an alkali or alkaline earth metal; and $n$ is 0 or 1. The amount of the metal salt should be at least equivalent, on a molecular basis, to the chlorine which is present in the phenol-phosphorus sulfochloride reaction product. The reaction is conducted at a temperature which may range from about 50 to about 160° C., preferably 60 to 100° C., and is continued until the final reaction product, after separation of the by-product metal chloride, contains not more than 0.5% by weight of chlorine. The reaction is generally complete within a period of 1 to 10 hours. It is usual to heat the mixture at the refluxing temperature of the solvent. No catalyst is required. The resulting mixture is filtered to remove the precipitated metal chloride and evaporated or distilled to remove the solvent.

The phenols which may be employed in the first step of the process, i. e., in the reaction with the phosphorus sulfochloride, may be phenol itself, or an alkylated phenol containing one or more alkyl groups ranging in chain length from 1 to 30 carbon atoms, and thus may include phenols of the type of cresol, butyl phenol, amyl phenol, diamyl phenol, tert.-octyl phenol, cetyl phenol, wax-alkylated phenols, petroleum phenols, and the like. Phenols containing unsaturated side chains, such as cardanol, a product derived from cashew nut shell oil, may also be used.

The organo-substituted thioacids of phosphorus, from which the metal salts employed in the second step of the process are derived, may be prepared by known means, as, for example, by reacting a sulfide of phosphorus with an alcohol, mercaptan or phenol at any convenient reacting temperature ranging from room temperature to about 250° F.

Among the alcohols which are generally preferred for use as starting materials in the preparation of the acids of phosphorus may be mentioned ethyl, isopropyl, and amyl alcohols, 2-ethylhexanol, methyl cyclohexanol, lauryl alcohol, a commercial mixture of $C_{10}$ to $C_{18}$ alcohols known as "Lorol B" alcohol, stearyl alcohol, alcohols derived from wool fat, sperm oil, natural waxes and the like, and similar compounds. A commercially important group of alcohols which may be conveniently employed in the preparation of the acids of phosphorus are the so called "Oxo" alcohols, which are primarily monohydric aliphatic alcohols of a branched chain character, obtained by the catalytic reaction of mono-olefins with carbon monoxide and hydrogen to form aldehydes and the subsequent hydrogenation of aldehydes to form the alcohols. Particularly important are the alcohols obtained in this manner from polypropylene and from propylene-butylene copolymers containing 6–16 carbon atoms. The corresponding mercaptans may be similarly employed, for example, n-butyl mercaptan, tert.-octyl mercaptan, tert.-dodecyl mercaptan, and the like. The phenols which may likewise be employed in preparing the thio acids of phosphorus include any of the phenols described above in connection with the first step of the process.

The metal salts of the above described acids of phosphorus may be readily prepared by reacting the acid with the hydroxide of an alkali or alkaline earth metal. The latter may be conveniently dissolved in methanol as the solvent, and the solution is added slowly at a temperature of about 30 to 50° C. until the acid is neutralized. The water of reaction and the solvent may then be removed by heating on the steam bath.

When the products of the present invention are added to mineral oils for the purpose of inhibiting oxidation of the same when in contact with air, they are preferably added in proportions of about 0.01 to about 10%, and usually 0.1 to 2%. The proportions giving the best results in given cases will vary somewhat in accordance with the nature of the additive and of the base oil and in accordance with the specific purpose the oil is to serve in a given case. For commercial purposes, when the additive is to be employed in mineral lubricating oils, it is convenient to prepare concentrated lubricating oil solutions in which the amount of the additive in the composition ranges from 25% to 50% by weight, and to transport and store them in such form. In preparing lubricating oil compositions for use, as in the crankcase of an internal combustion engine, the additive concentrate is merely blended with the base oil in the required amount.

Below is given a detailed description of the preparation and testing of an example of a mineral oil additive prepared in accordance with the method of the present invention. It is to be understood that this example is given by way of illustration only and is not to be construed as limiting the scope of the present invention in any way.

Example 1

300 g. (1.45 mols) of tertiary octyl phenol (prepared by alkylating phenol with commercial diisobutylene) and 30 g. of anhydrous aluminum chloride were charged into a reaction flask and the mixture was heated with agitation to 70° C. With a small stream of nitrogen bubbling through the mixture, 180 g. (1.06 mols) of phosphorus sulfochloride were added dropwise at 80–100° C., the addition requiring 30 minutes. The mixture was heated for 1¾ hours at 100–120° C., after which the introduction of nitrogen was discontinued and the mixture heated at 120–140° C. for 1 hour longer. After cooling to room temperature, the mixture was taken up with 400 cc. of benzene and washed twice with ice water acidified with hydrochloric acid. The benzene layer was dried over anhydrous calcium chloride and then heated on a steam bath to evaporate the solvent. A dark green viscous residue was obtained, which gave the following analysis:

|  | Per cent |
|---|---|
| Sulfur | 1.70 |
| Phosphorus | 1.32 |
| Chlorine | 2.04 |

100 g. of this product was then charged into a flask with 15.1 g. of potassium diisopropyl dithiophosphate (prepared by reacting isopropyl alcohol with $P_2S_5$ and converting the product into the potassium salt) and 300 cc. of chloroform as solvent. This mixture was refluxed with agitation for two hours, then filtered and the filtrate heated on a steam bath to remove the solvent. A green fluid oil was obtained which solidified on standing at room temperature. This product was found to give the following analysis:

|  | Per cent |
|---|---|
| Sulfur | 3.50 |
| Phosphorus | 2.50 |
| Chlorine | 0.49 |

Example 2

A blend was prepared containing 0.25% by weight of the product of Example 1 in a base oil consisting of an extracted Mid-Continent paraffinic lubricating oil of SAE 20 grade. A sample of this blend and a sample of the unblended base oil were submitted to a laboratory test designed to measure the effectiveness of the additive in inhibiting the corrosiveness of a typical mineral lubricating oil towards the surfaces of copper-lead bearings. The test, known as the S. O. D. Corrosion Test, was conducted as follows:

500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearings were removed, washed with naphtha and weighed to determine the amount of loss by corrosion. The bearings were then repolished (to increase the severity of the test), reweighed, and then subjected to the test for additional four-hour periods in like manner. The results are given in the following table as "corrosion life," which indicates the number of hours required for the bearings to lose 100 mg.

in weight, determined by interpolation of the data obtained in the various periods.

| Oil or Oil Blend | Bearing Corrosion Life (Hrs.) |
|---|---|
| Unblended Base oil | 9 |
| Base oil+0.25% product of Example 1 | 32 |

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like. Other types of additives, such as phenols and phenol sulfides, may also be present.

The lubricating oil base stock used in the composition of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coil tar fractions and coal tar or shale oil distillates may also be used. Also, for special applications, animal, vegetable or fish oils or their hydrogenated or voltolized products may be employed in admixtures with mineral oils.

For the best results the base stock chosen should normally be an oil which with the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, antioxidants, thickeners, viscosity index improvers, oiliness agents, resins, rubber, olefin polymers, and the like.

Assisting agents which are particularly desirable as plasticizers and defoamers are the higher alcohols having preferably 8–20 carbon atoms, e. g., octyl alcohol, lauryl alcohol, stearyl alcohol, and the like.

In addition to being employed in lubricants, the additives of the present invention may also be used in other petroleum hydrocarbon products such as motor fuels, hydraulic fuels, torque converter fluids, cutting oils, flushing oils, turbine oils, transformer oils, industrial oils, process oils, and the like, and generally as antioxidants in mineral oil products. They may also be used in gear lubricants, grease and other products containing mineral oils as ingredients.

What is claimed is:

1. A petroleum hydrocarbon product containing dissolved therein 0.01 to 10% by weight of a product prepared by first heating about two molecular proportions of a phenol with one molecular proportion of phosphorus sulfochloride at a temperature of about 100 to 160° C. for a period of time sufficient to produce a reaction product which, after separation of any unreacted phosphorus sulfochloride, contains at least 1% by weight each of sulfur and phosphorus and at least 0.75% by weight of chlorine, and further reacting such reaction product with an amount at least equivalent to the chlorine present in such reaction product of a metal salt of the formula—

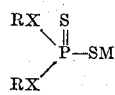

where R is a hydrocarbon radical containing 2 to 30 carbon atoms, X is an element selected from the group consisting of oxygen and sulfur, and M represents the hydrogen equivalent of a metal selected from the group consisting of alkali and alkaline earth metals, by heating together at a temperature of about 50 to about 160° C. for a period of time sufficient to produce a final reaction product which, after separation of the by-product metal chloride, contains not more than 0.5% by weight of chlorine.

2. A composition according to claim 1 in which the petroleum hydrocarbon product is a lubricating oil fraction.

3. A composition according to claim 1 in which the phenol is tertiary octyl phenol.

4. A composition according to claim 1 in which X of the formula is oxygen.

5. A composition according to claim 1 in which M of the formula is an alkali metal.

6. A composition according to claim 1 in which the phenol is tertiary octyl phenol and in which the first step of the process described is conducted in the presence of a Friedel-Crafts type catalyst.

7. A composition according to claim 6 in which the catalyst is aluminum chloride.

8. A composition according to claim 1 in which the petroleum hydrocarbon product is a lubricating oil fraction, in which R of the formula is an alkyl group, and in which X of the formula is oxygen.

9. A composition according to claim 1 in which the petroleum hydrocarbon product is a lubricating oil fraction, in which R of the formula is an isopropyl radical, and in which M of the formula is potassium.

10. A mineral lubricating oil containing dissolved therein 0.01 to 10% by weight of a product prepared by first heating about two molecular proportions of tertiary octyl phenol with one molecular proportion of phosphorus sulfochloride at a temperature of about 100 to 160° C. for a period of 1 to 10 hours in the presence of aluminum chloride as catalyst, and reacting the product thus formed with an alkali metal dialkyl dithiophosphate, the latter being present in an amount approximately equivalent, on a molecular basis, to the chlorine present in the said product, said reaction being carried out by heating said product and dialkyl dithiophosphate together at a temperature of about 50° to about 160° C. for a period of time sufficient to produce a final reaction product which, after separation of the by-product metal chloride, contains not more than about 0.5% by weight of chlorine.

11. A mineral lubricating oil containing dissolved therein about 0.25% by weight of a product prepared by first heating about two molecular proportions of tertiary octyl phenol with one molecular proportion of phosphorus sulfochloride at a temperature of 110° to 140° C. for a period of about 1¾ hours in the presence of aluminum chloride as catalyst, and heating a mixture of the product thus formed and a sufficient amount of potassium diisopropyl dithiophosphate to react with all of the chlorine present in the presence of chloroform as a solvent at the refluxing temperature for a period of about two hours.

12. A composition consisting essentially of a mineral lubricating oil and an additive as defined in claim 1, the amount of said additive in the composition being 25-50% by weight.

13. A composition consisting essentially of a mineral lubricating oil and an additive as defined in claim 11, the amount of said additive in the composition being 25-50% by weight.

14. The process which comprises first heating about two molecular proportions of a phenol with one molecular proportion of phosphorus sulfochloride at a temperature of about 100-160° C. for a period of time sufficient to produce a reaction product which, after separation of any unreacted phosphorus sulfochloride, contains at least 1% by weight each of sulfur and phosphorus and at least 0.75% by weight of chlorine, and further reacting such reaction product with an amount at least equivalent to the chlorine present in such reaction product of a metal salt of the formula—

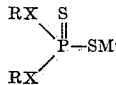

where R is a hydrocarbon radical containing 2 to 30 carbon atoms, X is an element selected from the group consisting of oxygen and sulfur, and M represents the hydrogen equivalent of a metal selected from the group consisting of alkali and alkaline earth metals, by heating together at a temperature of about 50 to about 160° C. for a period of time sufficient to produce a final reaction product which, after separation of the by-product metal chloride, contains not more than 0.5% by weight of chlorine.

15. A process according to claim 14 in which the first described reaction is conducted in the presence of a Friedel-Crafts type catalyst.

16. The process according to claim 15 in which the catalyst is aluminum chloride.

17. The process which comprises first heating about two molecular proportions of tertiary octyl phenol with one molecular proportion of phosphorus sulfochloride at about 100 to 160° C. for a period of about 1 to about 10 hours in the presence of aluminum chloride as catalyst, and heating the product thus formed with an amount of an alkali metal dialkyl dithiophosphate sufficient to react with the chlorine present in such product, in the presence of an inert solvent at a temperature of 50-100° C. for a period of 1 to 10 hours, and removing the solvent and by-product alkali metal chloride from the final reaction mixture.

18. The process which comprises heating about two molecular proportions of tertiary octyl phenol with one molecular proportion of phosphorus sulfochloride in the presence of aluminum chloride as catalyst at a temperature of 100-160° C. for a period of 1 to 10 hours, and reacting the product thus formed with an amount sufficient to react with the chlorine present in such product of potassium diisopropyl dithiophosphate in the presence of chloroform as solvent at the refluxing temperature of the solvent for a period of about two hours, filtering to remove the precipitated potassium chloride, and removing the solvent from the filtrate by evaporation.

WILLIAM H. BRUGMANN, Jr.

REFERENCES CITED

The following references are of record in the file of this patent:

UNITED STATES PATENTS

| Number | Name | Date |
| --- | --- | --- |
| 2,494,332 | Cyphers | Jan. 10, 1950 |
| 2,511,731 | McNulty | June 13, 1950 |